Feb. 10, 1948.  J. L. BIGGS  2,435,768
PUSHER CONVEYOR UNIT
Filed Jan. 19, 1946  5 Sheets-Sheet 1

Inventor:
John Leo Biggs
By Robert H. Wendt
Atty.

Feb. 10, 1948. J. L. BIGGS 2,435,768
PUSHER CONVEYOR UNIT
Filed Jan. 19, 1946 5 Sheets-Sheet 2

Inventor
John Leo Biggs
By Robert H. Wendt
Atty.

Feb. 10, 1948.   J. L. BIGGS   2,435,768
PUSHER CONVEYOR UNIT
Filed Jan. 19, 1946   5 Sheets-Sheet 3
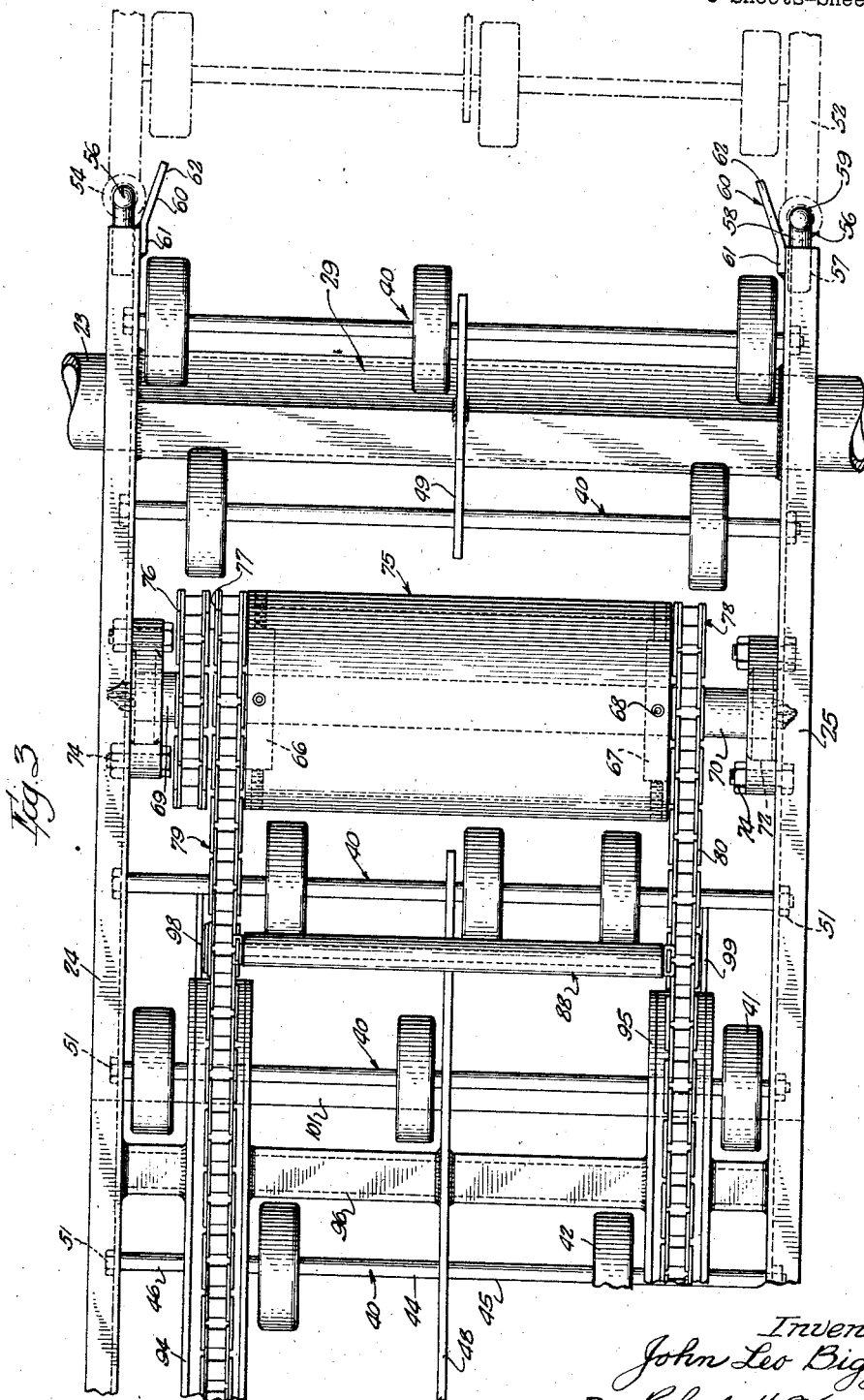
Inventor:
John Leo Biggs
By: Robert H. Wendt
Atty.

Feb. 10, 1948.   J. L. BIGGS   2,435,768
PUSHER CONVEYOR UNIT
Filed Jan. 19, 1946   5 Sheets-Sheet 4
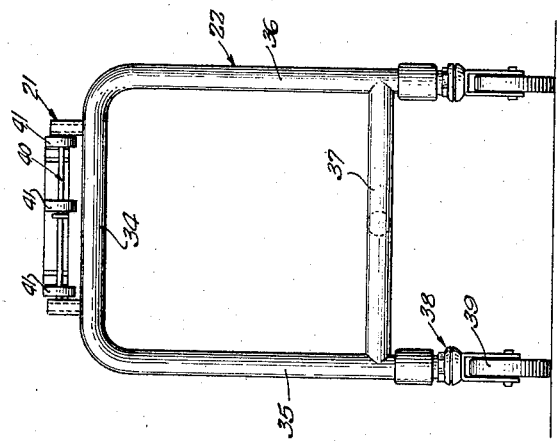
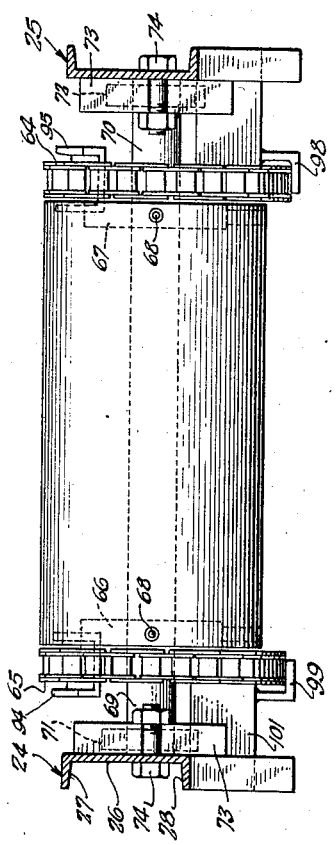
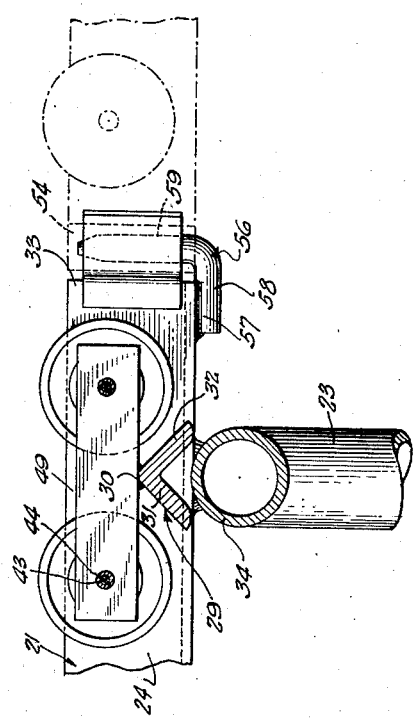
Inventor
John Leo Biggs
By Robert H. Wendt
Atty.

Feb. 10, 1948.  J. L. BIGGS  2,435,768
PUSHER CONVEYOR UNIT
Filed Jan. 19, 1946  5 Sheets-Sheet 5
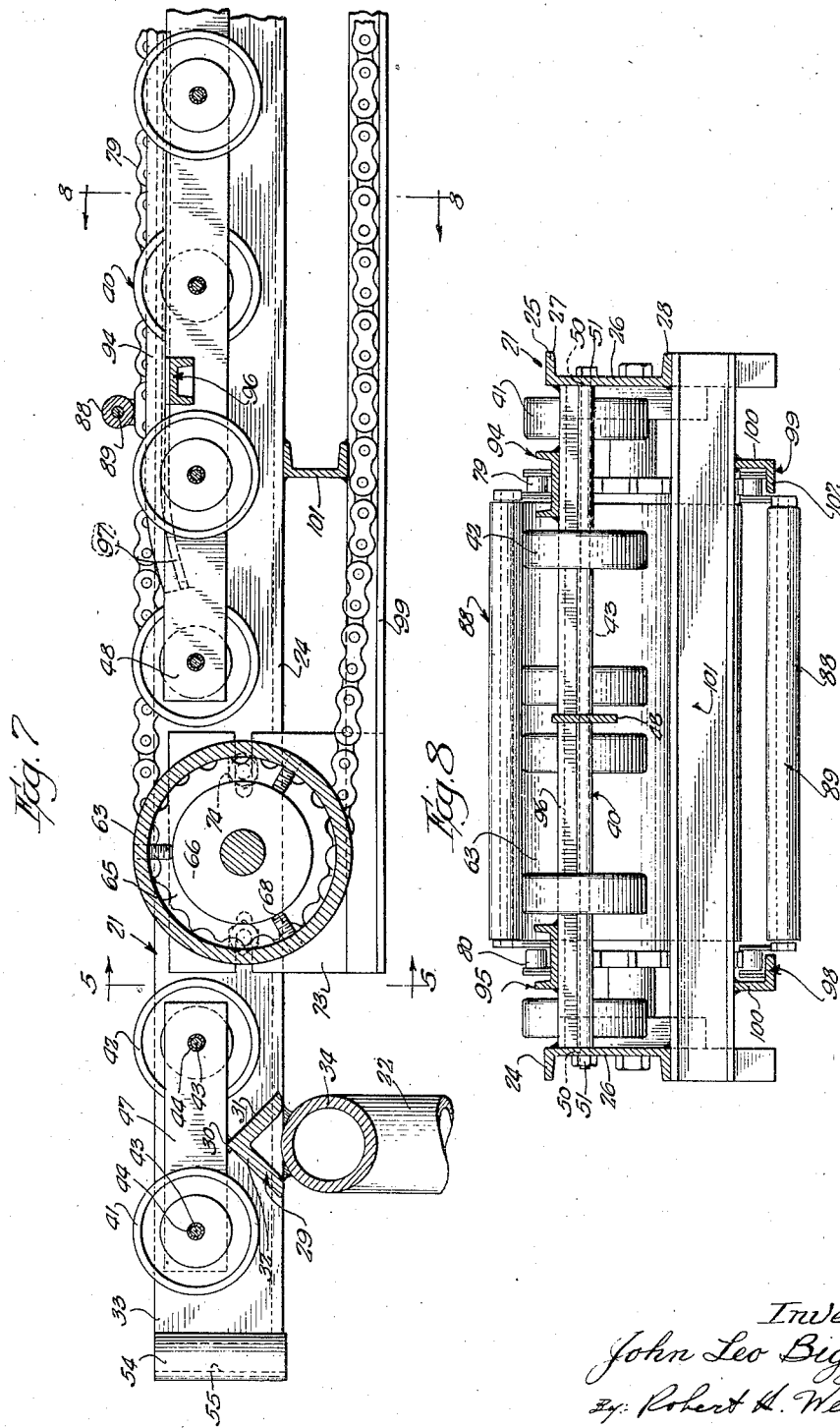
Inventor
John Leo Biggs
By: Robert H. Weadt
Atty.

Patented Feb. 10, 1948

2,435,768

UNITED STATES PATENT OFFICE 2,435,768

PUSHER CONVEYOR UNIT

John Leo Biggs, Chicago, Ill.

Application January 19, 1946, Serial No. 642,139

3 Claims. (Cl. 198—168)

The present invention relates to motorized conveyor units, and is particularly concerned with conveyor units of the type in which the packages or merchandise are adapted to be supported upon anti-friction rollers.

One of the objects of the invention is the provision of an improved motorized conveyor unit which may be assembled with other similar units of the gravity type in order that merchandise to be conveyed may be conveyed more expeditiously and certainly and in order that it may be hoisted to higher levels or loaded upon trucks or conveyed to various points that could not be done by the ordinary gravity units.

Another object of the invention is the provision of an improved conveyor unit of the class described which is simple, capable of economical manufacture, which is durable, and which is equally adaptable to the conveying of light packages and heavy loads with a minimum amount of friction.

Another object of the invention is the provision of an improved conveyor unit construction which is so constructed that, although the conveyor chains and pusher bars are adapted to carry light loads directly on the chains, the chain guides are so resiliently supported that they are adapted to give and place the load upon the anti-friction rollers, whenever the load is a heavy one, thus relieving the chains from the friction that would otherwise be encountered between the chains and the guides when engaged by heavy loads.

Another object of the invention is the provision of an improved conveyor unit of the class described which utilizes a minimum amount of power, which is compact and occupies a minimum amount of space, and which is stable and safe in its operation.

Other objects and advantages of the invention will be apparent from the following description and the accompanying drawings, in which similar characters of reference indicate similar parts throughout the several views.

Referring to the drawings, of which there are five sheets,

Fig. 3 is a fragmentary top plan view of the right end of the conveyor of Fig. 1;

Fig. 4 is an end elevational view taken from the left end of Fig. 1;

Fig. 5 is a fragmentary elevational view showing the mode of support of the conveyor chains at the left of Fig. 1;

Fig. 6 is a fragmentary side elevational view in partial section showing the mode of connection of two conveyor units and the mode of support of the conveyor frame on its legs;

Fig. 7 is a fragmentary sectional view showing the details of structure of the chain support and the load supporting rollers at the left end of Fig. 1;

Fig. 8 is a fragmentary sectional view taken on the plane of the line 8—8 of Fig. 7, looking in the direction of the arrows;

Fig. 9 is a fragmentary side elevational view of a chain link at the pusher roller; taken on the plane of the line 9—9 of Fig. 10;

Fig. 10 is a fragmentary top plan view of the chain construction at the point where a pusher roller is located;

Fig. 11 is a sectional view taken on the plane of the line 11—11 of Fig. 9, looking in the direction of the rollers.

Figure 1:
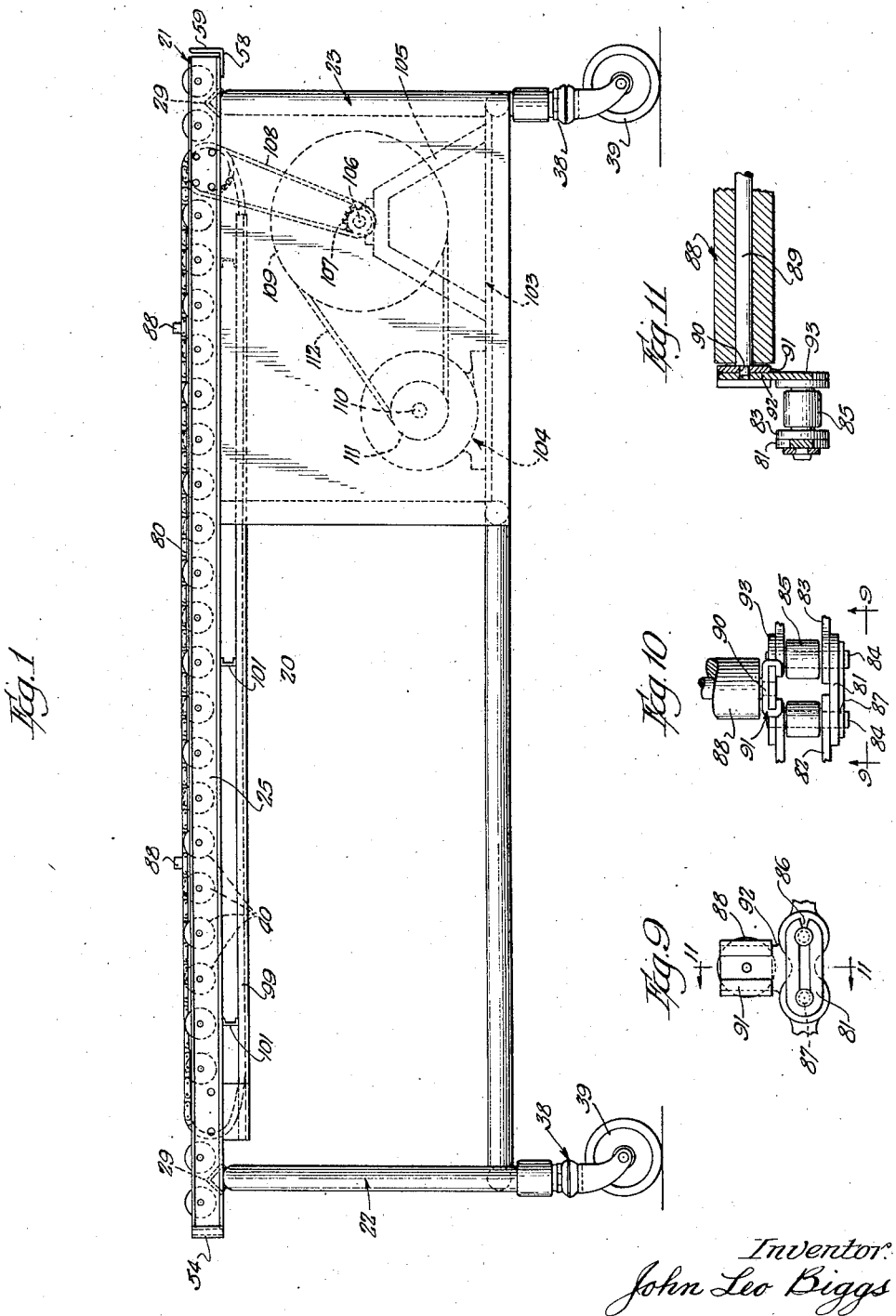
Fig. 1 is a side elevational view of a conveyor unit embodying my invention.

Referring to Figs. 1 to 4, the conveyor unit indicated in its entirety by the numeral 20 preferably comprises a substantially rectangular upper frame 21, which is carried at each end by the leg units 22, 23.

The rectangular frame 21 may consist of a pair of channeled members 24, 25, each channel having a relatively wide web 26 and a pair of outwardly turned flanges 27, 28, the web being vertically disposed.

The webs of the two channels 24, 25 may be joined by means of a plurality of transversely extending frame members 29 (Fig. 6), which may consist of angles. The angles are welded at their ends to the webs 26, and are preferably disposed with the apex 30 of each angle upward and the two sides 31, 32 of each angle extending diagonally downward.

The transverse frame members 29 may be located one adjacent each end of the frame 21, but spaced from the ends 33 of the channels, and there may be as many intermediate transverse frame members 29 as are necessary to provide a rigid frame, the number depending on the length of the unit.

The leg units 22 may be constructed of a substantially U-shaped pipe member having an upper straight yoke 34 and a pair of legs 35, 36, the legs being joined by a transverse brace 37 and being provided at their lower ends with suitable casters 38 rotatably mounted in the legs on ball bearings and provided with caster rollers 39.

The transverse angle frame members 29 may rest upon the straight upper portion 34 of the leg units, to which they may be welded, and the upper portions 34 of the leg units may also be welded to the side channels 24, 25.

The side channels 24, 25 support a multiplicity of transversely extending anti-friction roller units 40, these units being preferably arranged with their rollers 41, 42 staggered with respect to the next adjacent roller units.

Each roller unit consists of a metal rod 43 which carries a plurality of the ball bearing rollers 41 or 42 of the type utilized on ball bearing roller skates. The rods 43 are preferably of steel or other material having considerable tensile strength, but due to the size of the rods they do not have much resistance to bending. Each rod is provided with a threaded end portion which passes through a bore 50 in the channels 24 or 25 and with a nut 51 on each end of the rod.

The nuts 51 are threaded home until they engage the side channels 24 and 25 and the nuts are tightened until they place a predetermined tension on the rods 43 so that they support the rollers by virtue of their tension, this tension being resisted by the relatively heavy transverse frame members or columns 29.

Each of these rollers has the usual inner race engaging the rod 43 and the usual outer race engaging the hub of the roller 41 or 42 and the usual ball bearings between the races (not shown). The rollers 41 or the rollers 42 are spaced from each other by means of metal tubes 44, 45 or 46.

These tubes are of such length as to locate the rollers where desired, and they engage the ends of the inner races of the ball bearings on the rollers and space these races from each other and from the side frame members 24, 25. The spacing between successive rollers is less than the diameter of the rollers, and there is little danger of any package falling between the rollers.

Packages of smaller size than can be accommodated on a conveyor should be placed in boxes or other containers before being put on the conveyor.

In addition to being supported by the transverse frame members 24, 25 through the rods 43, the roller units 40 are also provided with intermediate means of support in the form of longitudinally extending bars 47, 48 (Fig. 2) or 49 (Fig. 3). These bars merely consist of a strip of metal which has apertures for receiving all of the rods 43 which pass through the bars 47—49.

The bars 47—49 are supported on the transverse angle frame members 29, to which they are welded so as to give the roller units additional support down the middle of the conveyor.

Figure 2:
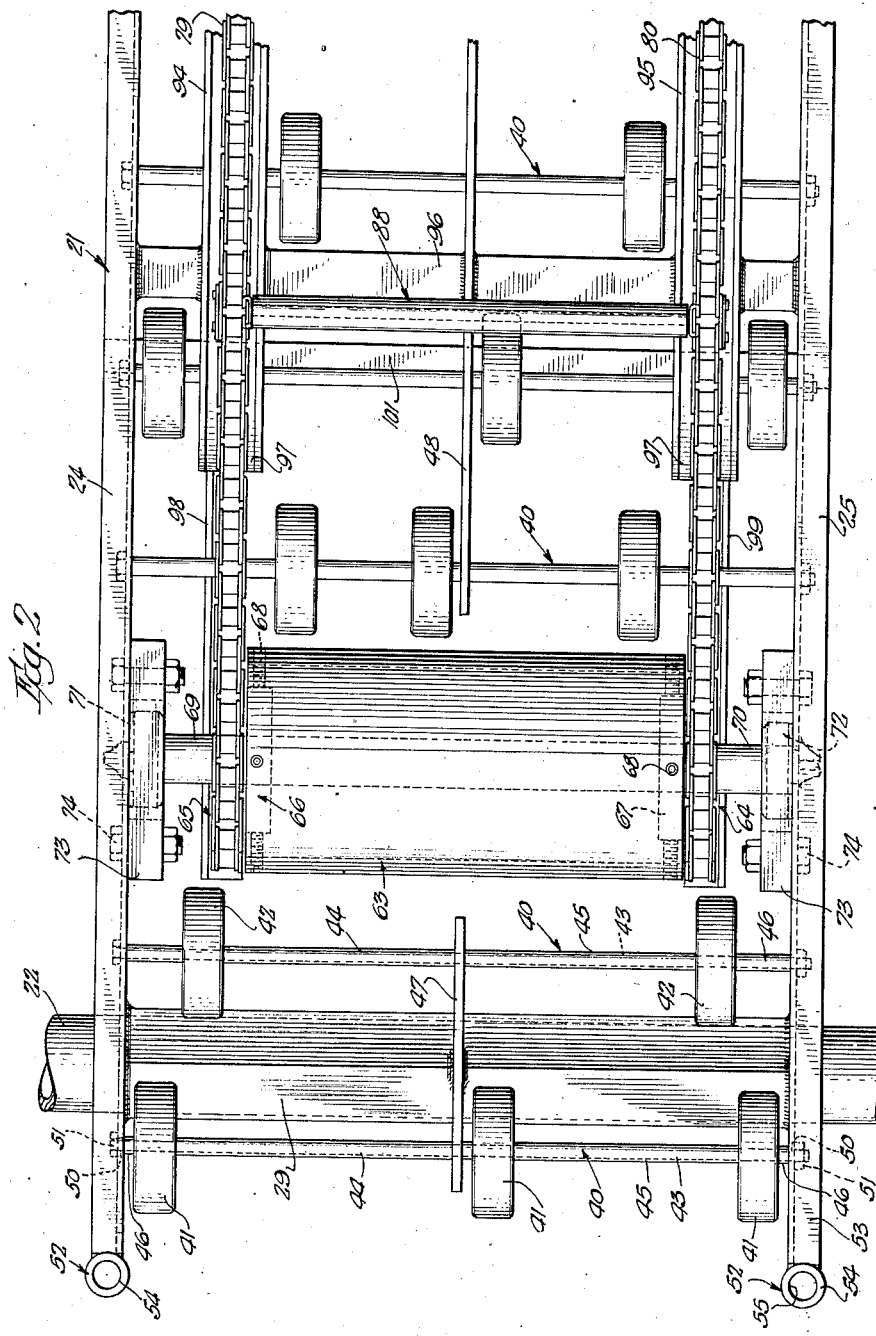
Fig. 2 is a fragmentary top plan view of the left end of the conveyor of Fig. 1.

One end of the conveyor unit, such as, for example, the left end in Fig. 2, is provided with a female member which may consist of a casting 52, having a rectangular shank 53, which is welded to the web and the side channels 24, 25. The shank 53 carries a substantially cylindrical body 54, having an axially extending bore 55.

The other end, that is, the right end of the conveyor (Fig. 1) is provided with a male connecting member 56, comprising a casting provided with a similar shank 57, again welded to all of the flanges of the channels 24, 25, and having a longitudinally extending portion 58, with an upwardly extending finger 59 of substantially cylindrical shape and provided with a blunt point on its upper end.

The finger 59 is spaced sufficiently from the end of the channels 24, 25 so that the female connecting member 52 may be inserted over the finger 59, which is received in the bore 55, as shown in Fig. 3 in dotted lines at the right.

In order to guide the connecting members 52 and 56 together, each of the channels is preferably provided on its inner side with a guide member 60, comprising a short strap of metal having an attaching flange 61 welded to the web of each channel and having a guiding portion 62, which is bent diagonally inward.

The outer surface of the flange 62 serves to guide the cylindrical members 52 into alignment with the fingers 59. Those two units may be secured together in such manner as to provide a continuous conveyor, or the present motorized unit may be used with other roller units of the gravity type to extend the conveyor, the packages being pushed on the latter by the former.

At one end the conveyor unit 20 is provided with a roller drum 63, having a pair of chain sprockets 64, 65. The roller drum 63 may consist of a cylindrical pipe, which is mounted on each end upon a hub 66, 67 and secured by means of set screws 68 located in threaded bores in the pipe and engaging the hubs 66, 67.

Each hub preferably carries a sprocket wheel 64 or 65 and a stub shaft or trunnion 69, 70 projecting axially from the drum 63. Each trunnion 69, 70 is rotatably mounted in an anti-friction bearing 71, 72, which is carried by a supporting plate 73, having a cylindrical socket for the outer race, the inner race being frictionally mounted on the trunnions 69, 70, and there being the usual balls between the races.

The plates 73 are secured to the side channels 24, 25 by a plurality of through bolts and nuts 74. The roller 63 is located between intermediate rollers 41, 42 in such manner as to provide adequate support for packages between the sprockets 64, 65. At the opposite end, that is, the right end in Figs. 1 and 3, the frame 21 supports a similar roller 75 provided with similar trunnions, bearings, and sprockets, except that at the upper end of the roller 75 in Fig. 3, that is, the driving end, the roller 75 is provided with a pair of sprockets 76, 77, while at its lower end it has but one sprocket 78 like the sprocket 64 or 65 of the roller 63.

The rollers 63 and 75 are preferably located inwardly of the ends of the frame 21 sufficiently to permit the chain to clear the end frame members 22, which carry the legs, and the longitudinally extending strips 47—49, which provide intermediate support for the rods 43, are spaced from the rollers 63, 75.

The sprockets at the ends of the rollers 63, 75 carry a pair of endless chains, preferably of the roller chain type, the chains being indicated at 79 and 80. These chains may be identical, and each may consist of a plurality of side links 81—83 (Fig. 10), which are perforated to receive the pintles 84, which carry the rollers 85.

Each pintle 84 passes through two side links 81—83, and the outermost links 81 may consist of substantially U-shaped links, which have a slot 86 at one end, so that they may be snapped out of the grooves 87 in the pintles 84 to separate the chain.

Snap links 81 are provided only at predetermined points so that the rest of the chain may have its pintles riveted, if it is desired; or snap links may be used throughout.

In order to provide for the driving of the packages on the conveyor unit the two chains 79 and 80 are each provided at regularly spaced points with pusher rollers 88 (Fig. 8). Each pusher roller consists of a cylindrical tube, which is rotatably mounted upon a rod 89, the rod having its ends reduced and riveted over in a bore 90 in a C-shaped clip 91.

This C-shaped clip is made of a strip of sheet metal, having the bore 90, and shaped to fit over an upwardly extending flange 92 carried by a special link 93 of each chain. The link 93 is the same in shape as other links 82, 83, but it has the upwardly or outwardly projecting rectangular flange 92, which fits in the clip 91.

The length of the flange 92 may be such that it is flush with the top of the clip 91, where these two members may be secured together by a weld. Thus the chains may have a plurality of the rollers 88 located at regularly spaced points and extending across from one chain to the other to engage the packages and drive them forwardly on the ball bearing rollers 41, 42.

The closeness of one roller to another will depend upon the strength of the packages and whether the packages will be crushed by being pushed by other packages, but ordinarily such pusher rollers 83 may be two or three feet apart.

The chain 79 extends around the sprockets 65 and 77, while the chain 80 extends around the sprockets 64 and 78, each of these chains having one portion located above the frame and another portion hanging downwardly below the frame.

The frame is preferably provided with guides intermediate the roller drums 63 and 75 for the chains, and these guides are indicated at 94, 95 (Fig. 2). These guides extend from a point near the roller drum 63 to points near the roller drum 75, parallel to each other; and they may consist of U-shaped channel members, as shown in Fig. 8, with the channel opening upward.

Each guide 94, 95 has its web welded to a plurality of transverse channelled frame members 96 (Fig. 7), which extend from side channels 24 to side channels 25, to which they are welded. Each guide 94, 95 preferably has its ends curved downwardly, as indicated at 97 in Fig. 7 so that there will be no danger of the chains catching on the ends of the guides.

The chain guides 94, 95 are of sufficient width between their side flanges to receive the two chains, the chains resting on the web of each channel 94, 95 by means of the edges of the links of the chains. Thus the chains will be supported in substantially horizontal position throughout the major portion of the length of the chain, and the chains are preferably supported at an elevation which is only slightly above the ball bearing rollers 41, 42.

Light loads may be carried upon the chains 79, 80 and slide in the channels 94, 95 without much friction when the load is light. When the load is heavier, the frame members, comprising the transverse frame members 96 and the longitudinally extending frame members 47, 48, are adapted to give to permit the guides 94, 95 to be depressed sufficiently so that the chains are below the upper level of the ball bearing rollers 41, 42.

The chain guides 94, 95 are adapted to be depressed by heavy loads because they are supported only by relatively light transverse frame members 96, but the rollers are not adapted to be depressed under the same conditions because they are supported by the tensioned rods 43, the tension of which makes them tight and stiff and also places a column load on the transverse frame members 96, which are light in construction and widely spaced from each other. Thus heavy loads depress the chain guides and chains and are supported by the rollers, while light loads are carried by the chains alone, with a minimum amount of friction.

Thus heavier loads will be carried by the ball bearing rollers without causing the chains to drag by friction in their channels 94, 95. The lower section of each chain is also preferably provided with a suitable guide and support of the type indicated at 98, 99 (Fig. 8). These guides 98, 99 may comprise angle members having one flange 100 welded to a transverse frame member 101 and the other horizontally extending flange 102 directed inwardly underneath the chains 79 and 80 sufficiently to engage the outer links, but spaced from each other far enough to prevent interference with the ends of the pusher rollers 88.

The transverse frame members 101 may comprise channels which are welded adjacent their ends to the lower ends of the side flanges 24, 25; and thus the lower sections of the chains, which depend from the sprockets, are also supported for sliding movement on the guides 98, 99.

Referring to Fig. 1, the leg members 22, 23 may support an auxiliary frame 103 adjacent the driving end or leg member 23 for carrying an electric motor 104 and hangers 105 for an intermediate shaft 106.

The shaft 106 may carry a sprocket 107 at the end which is located under the sprocket 76, and the sprockets 107 and 76 may be connected in driving relation by a chain 108. At its opposite end the shaft 106 may support a relatively large V-pulley 109, which, like the sprocket 107, is fixedly secured to shaft 106. The motor shaft 110 also supports a smaller V-pulley 111 fixedly secured to the shaft, and a V-belt 112 may be arranged in driving relation between the V-pulleys 111 and 109.

The motor 104 may be of any type suitable for the type of current available, but is preferably of the A. C., D. C. commutator type so that it may be used under various different conditions.

The operation of the motorized conveyor is as follows: The present motorized unit 20 may be combined with any suitable number of nonmotorized units of the same construction, end to end, as shown in Fig. 3, so that, when packages are placed upon these conveyor units, the pusher rollers of the motorized unit will drive packages; and thereafter they will be driven on the non-motorized units by the push of other packages.

The motor 104 runs at a relatively fast speed, but the driving speed of the shaft 106 is reduced by means of the relatively large V-pulley 109 and small driving V-pulley 111, and again by the use of a small sprocket 107.

Light loads that are placed upon the motorized unit will be carried by the chains themselves, which rest in the channelled guides 94, 95, and heavier loads will cause the upper sections of the chains to be depressed, due to their weight and due to the resiliency of the chain guide supports, so that the weight will be carried by the ball bearing rollers 41, 42 on the rods 43. Thus the heavy loads will not cause a great deal of friction, as would be the case if their weight were supported upon the chains, which slide in the guides 94, 95.

Friction is reduced to a minimum, as heavy loads are carried directly by the ball bearing rollers 41, 42. Without motorized units of the type embodying the present invention, the conveyors of the prior art of this construction were limited to use for conveying packages by gravity; but with the present motorized units the packages may be conveyed over relatively long distances and may be lifted from one elevation to another, or the motorized units may be employed for boosting the elevation of packages periodically in a long gravity conveyor system of nonmotorized units.

The present conveyors are simple in construction and adapted to be manufactured at a low cost, and they may be used for a long period of time without necessity for repair or replacement of parts. Such conveyor units reduce greatly the necessity for unskilled labor in transporting materials from one place to another, and also to reduce the cost of handling such materials.

In the event a package lands upon the pusher rollers, such a pusher roller will roll under the package until the package is behind the pusher roller on which it has fallen, and the package will then be pushed by other packages or by the next pusher roller.

The pusher rollers project upward sufficiently so that there is no tendency of a driven package to rise up over the roller, and the heavier loads that are resting upon the ball bearing rollers are driven by the pusher rollers of the chains.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A conveyor unit comprising a substantially rectangular frame comprising a pair of longitudinally extending frame members and a plurality of rigid transversely extending frame members, said frame being provided with a plurality of regularly spaced transversely extending tensioned rods, the said rods supporting a multiplicity of anti-friction rollers, the rollers being staggered longitudinally of said rods with respect to those on the next rod, and the rods being close enough so that the rollers are adapted to support packages throughout the length of the unit, and power driven means carried by said frame and adapted to drive the packages forwardly from one end of the unit toward the other when supported by said rollers, said power driven means comprising a pair of sprocket supported chains extending parallel to each other, the said chains being carried by sprockets located adjacent the ends of said unit and rotatably mounted thereon, the said chains being joined by transversely extending pusher rollers located at regularly spaced points on said chains, and chain guides carried by said frame, the said chain guides comprising upwardly open channels for receiving the lower sides of the chains and slidably supporting the chains in substantially horizontal position, said chain guides being resiliently supported with the chains slightly above the anti-friction rollers, whereby heavy loads are adapted to depress the chains below the surfaces of the anti-friction rollers so that the loads will be carried by said rollers.

2. In a conveyor unit, the combination of a substantially rigid rectangular frame, said frame comprising a pair of longitudinally extending stiff channels joined by a plurality of transversely extending angle members welded to said channels at regularly spaced points, a plurality of tensioned rods extending from channel to channel, said rods being provided with threaded portions and complementary threaded members, whereby they may be placed under tension and rendered relatively stiff, said rods supporting a plurality of spacers and anti-friction rollers, and the rollers upon one rod being staggered with respect to rollers on adjacent rods, a pair of longitudinally extending upwardly open chain guides, said chain guides being resiliently supported upon relatively light transverse resilient frame members and the chains being supported slightly above the rollers, sprockets at each end of said frame for supporting said chains, the chains being endless, and transverse roller members carried by oppositely located links of said chains and at regularly spaced points for pushing articles longitudinally of the frame on the chain or rollers, the said chains and chain guides being depressed by the application of heavy loads so that heavy loads are carried by the rollers, and the chains and chain guides being of sufficient strength to support light loads without engaging the rollers, whereby both light and heavy loads may be moved with a minimum amount of friction.

3. In a conveyor unit, the combination of a substantially rigid rectangular frame, said frame comprising a pair of longitudinally extending stiff channels joined by a plurality of transversely extending angle members welded to said channels at regularly spaced points, a plurality of tensioned rods extending from channel to channel, said rods being provided with threaded portions and complementary threaded members, whereby they may be placed under tension and rendered relatively stiff, said rods supporting a plurality of spacers and anti-friction rollers, and the rollers upon one rod being staggered with respect to rollers on adjacent rods, a pair of longitudinally extending upwardly open chain guides, said chain guides being resiliently supported upon relatively light transverse resilient frame members and the chains being supported slightly above the rollers, sprockets at each end of said frame for supporting said chains, the chains being endless, and transverse roller members carried by oppositely located links of said chains and at regularly spaced points for pushing articles longitudinally of the frame on the chain or rollers, the said chains and chain guides being depressed by the application of heavy loads so that heavy loads are carried by the rollers, and the chains and chain guides being of sufficient strength to support light loads without engaging the rollers, whereby both light and heavy loads may be moved with a minimum amount of friction, said sprockets for supporting said chains being joined in pairs at each end of the frame by means of a drum, the upper surface of the drum being in substantially the same plane as the upper surfaces of the rollers for supporting articles to be conveyed at the points between the sprockets, and driving means for driving said sprockets, drums and chains, whereby the pusher rollers are adapted to cause articles to progress along the conveyor.

JOHN LEO BIGGS.

REFERENCES CITED

The following references are of record in the file of this patent:

UNITED STATES PATENTS

| Number | Name | Date |
| --- | --- | --- |
| 469,137 | Hall | Feb. 16, 1892 |
| 790,811 | Alvey | May 23, 1905 |
| 872,856 | Spence | Dec. 3, 1907 |
| 925,928 | Lueke | June 22, 1909 |
| 1,028,589 | Moore | June 4, 1912 |
| 1,450,225 | Rebstock | Apr. 3, 1923 |
| 1,534,334 | Stutsman | Apr. 21, 1925 |
| 1,669,497 | Steegmuller | May 15, 1928 |